United States Patent [19]
Tsunoda

[11] 3,799,025
[45] Mar. 26, 1974

[54] VIBRATION-DAMPED ROTATABLE CUTTING DISK

[75] Inventor: Kenneth Tsunoda, Closter, N.J.

[73] Assignee: Paul W. Garbo, Freeport, N.Y.; a part interest

[22] Filed: July 23, 1971

[21] Appl. No.: 165,498

[52] U.S. Cl............. 83/835, 83/676, 144/240, 144/218
[51] Int. Cl............. B27b 33/08, B23d 61/02
[58] Field of Search ........ 143/133 R, 133 B, 157 G, 143/33 R; 83/835, 676, 663; 144/218, 240

[56] References Cited
UNITED STATES PATENTS

| | | | |
|---|---|---|---|
| 2,383,400 | 8/1945 | McFarland | 143/157 G |
| 2,563,559 | 8/1951 | Sneva | 143/133 R |
| 3,292,237 | 12/1966 | Fisher | 143/133 B |

FOREIGN PATENTS OR APPLICATIONS

| | | | |
|---|---|---|---|
| 183,743 | 7/1936 | Switzerland | 143/133 B |

*Primary Examiner*—Donald R. Schran
*Attorney, Agent, or Firm*—Paul W. Garbo

[57] ABSTRACT

The noise generated by a rotating disk-like member when it contacts a fixed or movable element is appreciably diminished by coating one surface of the disk-like member with a viscoelastic material and adhering a rigid sheet to the viscoelastic material. Rotary saw blades and gear wheels illustrate disks that are vibration-damped pursuant to the invention.

6 Claims, 8 Drawing Figures

PATENTED MAR 26 1974 3,799,025
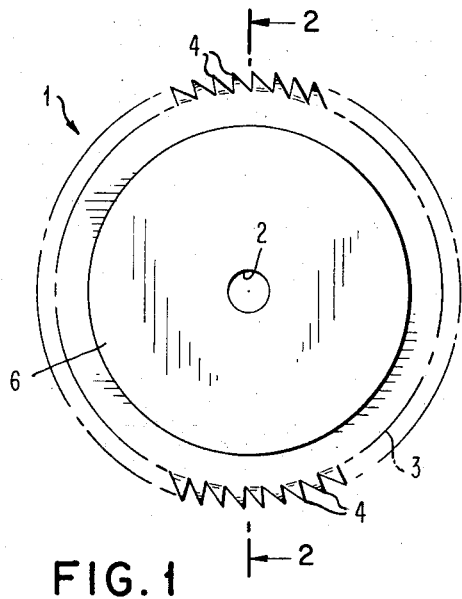
FIG. 1
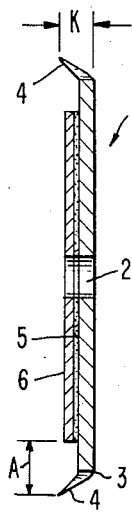
FIG. 2
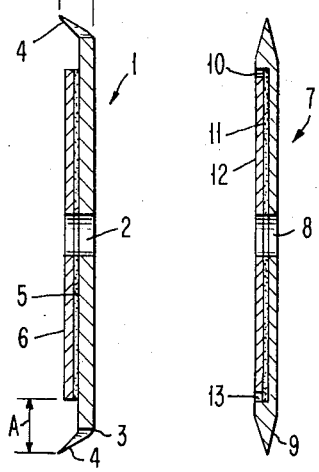
FIG. 3
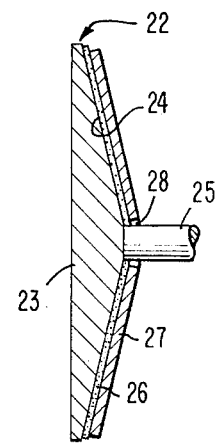
FIG. 6
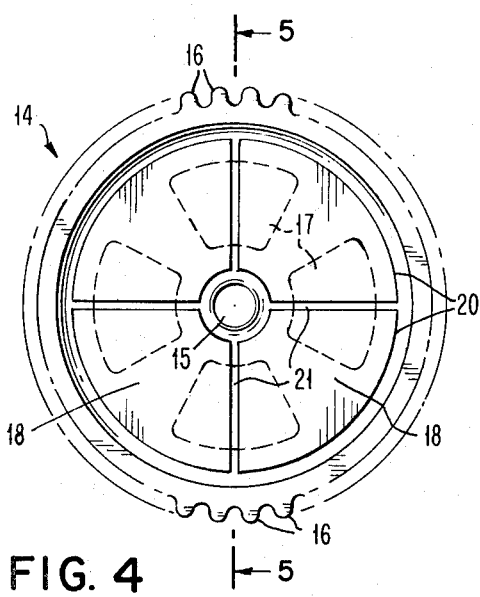
FIG. 4
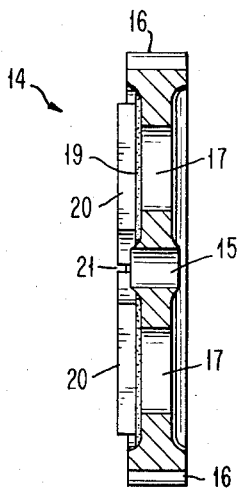
FIG. 5
FIG. 7
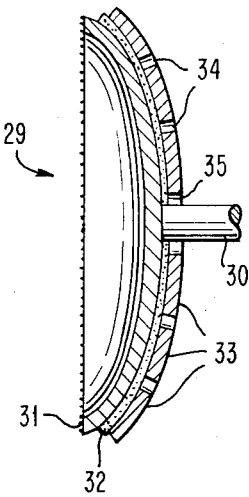
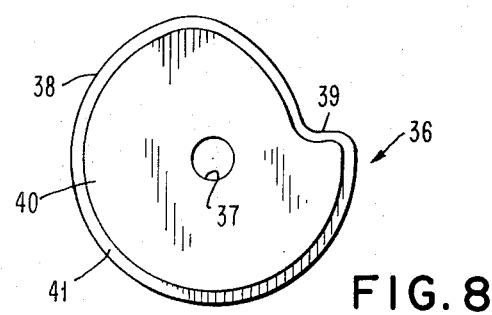
FIG. 8
INVENTOR.
KENNETH TSUNODA
BY Paul W. Larbo
AGENT

VIBRATION-DAMPED ROTATABLE CUTTING DISK

BACKGROUND OF THE INVENTION

This invention relates to a rotatable disk-like member which contacts a fixed or movable element but is vibration-damped and acoustically deadened.

Rotatable disk-like members, such as rotary saw blades, gear wheels, cam plates and polishing wheels which contact a fixed or moving element have long been a source of intense noise particularly when such members attain high rotational speeds. For instance, a rotary saw blade cutting through lumber or a gear wheel meshing with a gear rack or another gear wheel generates troublesome noise.

Accordingly, the object of this invention FIGS. to provide an improved structure for rotatable disk-like members that are vibration-damped and, therefore, acoustically deadened when driven at high rotational speed in contact with a stationary or movable element.

All the disk-like members to which this invention is applicable are not 2) circular; for example, rotary cam plates can have all sorts of non-circular shapes. Likewise, such disk-like members are not necessarily flat; they may be slightly tapered or dished on one or both faces. Moreover, the disk-like members may have openings or cut-outs extending therethrough, usually to diminish the weight of the members. For simplicity of the description of the invention, all such variations of disk-like members shall hereinafter be embraced by the term, disk.

SUMMARY OF THE INVENTION

In accordance with this invention, the vibration-damping of a rotatable disk is achieved by applying a layer of viscoelastic material to one of the two sides of the disk and bonding a relatively rigid sheet to the layer of viscoelastic material.

The viscoelastic material may be any elastomeric material having high mechanical hysteresis or internal friction but low modulus of elasticity compared to the disk and the relatively rigid sheet between which the viscoelastic material is disposed. The efficiency of damping depends not only on the energy dissipation capacity of the viscoelastic layer but also on the proper coupling of the disk, the viscoelastic material and the relatively rigid sheet or constraining layer so that the vibrating energy of the disk is transferred to the viscoelastic layer and dissipated as heat. Amorphous polymers or copolymers, such as natural or synthetic rubber, polyvinyl chloride or alcohol, polypropylene, polyurethane and the like are suitable viscoelastic materials for the purpose of this invention. Glycol-diisocyanate copolymers are particularly desirable for use as the viscoelastic layer of the rotatable disk of this invention.

Generally, it is advisable to make the thickness of the layer of viscoelastic material not more than about half of the thickness of the portion of the rotatable disk on which it is applied and not more than about the full thickness of the relatively rigid or stiff sheet which is bonded thereto. Generally, the rigid sheet has a thickness less than that of the disk; in many cases, the rigid sheet is preferably not more than about half as thick as the disk. It is often preferable to make the combined thickness of the rigid sheet and the viscoelastic layer not more than about the thickness of the disk.

The rotatable disk, such as a rotary saw or knife blade, a gear wheel or a cam plate, is commonly made of ordinary steel. However, other metals including stainless steel, brass, bronze and various alloys, or relatively rigid plastics are also used to make some rotatable disks. Other rotary disks like grinding wheels and cutting disks are made of hard abrasive materials such as silicon carbide and fused alumina.

The relatively rigid sheet which is bonded to the viscoelastic layer may be made of the same metal as the rotatable disk or of a different metal. This relatively rigid sheet or constraining layer may also be made of materials other than metals. Suitable rigid materials include ceramic products or hard plastics.

The rigid sheet or constraining layer which adheres to the layer of viscoelastic material is usually continuous or unitary but may be segmented. When the rigid sheet is in the form of two or more segments, which in some instances are more easily applied to the viscoelastic layer than a single unit can be, the segments are separated from each other by narrow gaps or clearances. In this way, adjacent segments are prevented from rubbing or contacting one another even when the rotating disk associated therewith undergoes substantial vibration. It is advisable to arrange the rigid sheet segments so as to be symmetrical and balanced relative to the axis of the rotary disk to which they are attached by the viscoelastic layer. Otherwise, any unbalance upsets the smooth operation of the rotatable disk at high rotational speed.

For a fuller understanding of the invention, illustrative embodiments will now be described in detail in connection with the accompanying drawings.

BRIEF DESCRIPTION OF THE DRAWINGS

FIG. 1 is a front view of a rotary saw blade with the viscoelastic material and rigid sheet on one surface of the blade;

FIG. 2 is a sectional view of the saw blade of FIG. 1 taken along the line 2—2;

FIG. 3 is a sectional view, similar to FIG. 2, of a rotary knife blade with the viscoelastic material and rigid sheet on a depressed surface of the blade;

FIG. 4 is a front view of a gear wheel with the vibration-damping of this invention;

FIG. 5 is a sectional view of the gear wheel of FIG. 4 taken along the line 5—5;

FIG. 6 is a similar sectional view of a rotary grinding or polishing head;

FIG. 7 is another sectional view of a rotary dished cutter having an abrasive edge; and FIG. 8 is a front view of a rotatable cam plate which is provided with a constraining layer.

DESCRIPTION OF PREFERRED EMBODIMENTS

The rotary saw blade 1 of FIGS. 1 and 2 has central hole 2 for mounting on a rotatable shaft and toothed edge 3. As usual, individual teeth 4 are twisted or bent out of the plane of blade 1 so that the width of the cut or kerf made by blade 1 in sawing lumber is slightly wider than the body of blade 1. The kerf width of blade 1 is shown at K in FIG. 2. Pursuant to this invention, viscoelastic layer 5 is bonded to one face of blade 1 and to a circular piece of relatively rigid sheet 6. Desirably, the total width of blade 1, viscoelastic layer 5 and rigid sheet 6 does not exceed the kerf width K. However, the total width of the vibration-damped saw blade may exceed the kerf width where such blade is used to cut wooden boards or plywood of common thickness, say up to about one-inch thickness. In such case, the exposed annular width A (see FIG. 2) of saw blade 1 is made somewhat greater than the thickness of the material to be cut by blade 1.

FIG. 3 is a sectional view of a rotary knife blade 7 having central hole 8 for mounting on a rotatable shaft and sharpened cutting edge 9. One side of blade 7 has been cut out to form a circular depression 10. Layer 11 of viscoelastic material coats depressed face 10 and a circular rigid sheet 12 is bonded to layer 11. The diameter of sheet 12 is slightly less than the diameter of circular depression 10 so that a small gap or clearance 13 is left between the periphery of sheet 12 and the edge of circular depression 10. Thus, sheet 12 and blade 7 cannot rub together even when blade 7 vibrates at high rotational speed while cutting a desired material.

FIGS. 4 and 5 show gear wheel 14 having central aperture 15 and gear teeth 16 on its periphery. Gear wheel 14 has four equally spaced openings 17 extending therethrough to decrease the weight of gear wheel 14. The areas of wheel 14 between adjacent openings 17 are in effect web-like spokes 18 between the hub portion around central hole 15 and the peripheral portion provided with gear teeth 16. Layer 19 of viscoelastic material coats one face of wheel 14 and four equal circular segments 20 of a rigid sheet are bonded to layer 19 with narrow gaps 21 between adjacent segments 20. While rigid segments 20 are shown as extending over openings 17 in gear wheel 14, the portion of each segment 20 extending over an opening 17 may be cut away if desired.

FIG. 6 is a sectional view of a rotatable grinding or polishing head 22 having a flat abrasive face 23 and a slightly conical back 24 to the center of which is attached stem or axle 25 for insertion in the chuck of a rotary drill. Viscoelastic layer 26 is bonded to tapered back 24 and rigid or stiff sheet 27 is similarly attached to layer 26 in the form of a single unit or of two or more balanced segments conforming to the shape of back 24. Gap 28 around axle 25 prevents sheet 27 from rubbing axle 25 when head 22 vibrates during use.

FIG. 7 represents a section of concave or dished cutting head 29 mounted on central axle 30 and having a cutting edge 31 in which hard abrasive particles are embedded so as to cut circular grooves in a material such as marble when cutting head 29 is rotated at high rotational speed. The slightly curved back of head 29 is coated with layer 32 of viscoelastic material and three concentric circular bands 33 of a rigid sheet are bonded to layer 32 with small gaps 34 between adjacent bands 33. Gap 35 isolates the smallest circular band 33 from axle 30.

FIG. 8 shows the face of rotatable cam plate 36 having hole 37 for mounting on a rotary shaft and outer edge 38 which includes a stepped or cut-out section 39. As known, a cam follower roller is provided to ride in contact with edge 38 including section 39 thereof as cam plate 36 is rotated. Rigid sheet 40 with substantially the same configuration of cam plate 36 but slightly smaller than plate 36 is attached to plate 36 by an intervening layer of viscoelastic material. Marginal band 41 along edge 38 of cam plate 36 is not covered by rigid sheet 40 to ensure that the cam follower roller riding on edge 38 will not also contact sheet 40.

It is well to note in the foregoing embodiments of the invention that appreciable vibration-damping of a rotary disk is achieved with a constraining layer covering a substantial portion of one surface of the rotatable disk. Generally, at least 40 percent of the area of the disk face is covered by the constraining layer. Of course, the greater the coverage is, the greater will be the vibration-damping of the rotary disk. Therefore, preferably the rigid sheet or constraining layer covers at least 60 percent of the face area of the rotatable disk to which the rigid sheet is bonded by the viscoelastic material.

What is claimed is:

1. A vibration-damped rotatable disk with a cutting periphery that contacts a fixed or movable element during rotation, which comprises a layer of viscoelastic material adherent to one face of said disk, and a relatively rigid sheet of a thickness less than that of said disk bonded to said layer of viscoelastic material and covering a substantial portion of said face of said disk, the combined thickness of said rigid sheet and said layer of viscoelastic material being not more than the thickness of said disk.

2. The vibration-damped rotatable disk of claim 1 wherein the layer of viscoelastic material has a thickness of not more than about half of the thickness of said disk.

3. The vibration-damped rotatable disk of claim 1 wherein the layer of viscoelastic material comprises a material selected from the group consisting of amorphous polymers and copolymers.

4. The vibration-damped rotatable disk of claim 1 wherein said disk and the rigid sheet are made of metal.

5. The vibration-damped rotatable disk of claim 4 wherein said disk is a rotary saw blade with teeth on the periphery.

6. The vibration-damped rotatable disk of claim 4 wherein said disk is a rotary cutting blade with a circular depression in one face of said blade and the rigid sheet fits within said depression and is bonded to said depression by the layer of the viscoelastic material.

* * * * *